United States Patent
Frachtenberg

(10) Patent No.: US 9,792,226 B2
(45) Date of Patent: *Oct. 17, 2017

(54) PREDICTIVE CACHE REPLACEMENT

(71) Applicant: Facebook, Inc., Menlo Park, CA (US)

(72) Inventor: Eitan Frachtenberg, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,486

(22) Filed: Apr. 22, 2016

(65) Prior Publication Data

US 2016/0239433 A1    Aug. 18, 2016

Related U.S. Application Data

(63) Continuation of application No. 13/674,805, filed on Nov. 12, 2012, now Pat. No. 9,323,695.

(51) Int. Cl.
*G06F 12/122* (2016.01)
*G06F 12/121* (2016.01)
*G06F 12/0862* (2016.01)
*G06F 12/0891* (2016.01)
*G06N 7/00* (2006.01)

(52) U.S. Cl.
CPC ........ *G06F 12/122* (2013.01); *G06F 12/0862* (2013.01); *G06F 12/0891* (2013.01); *G06F 12/121* (2013.01); *G06N 7/005* (2013.01); *G06F 2212/502* (2013.01); *G06F 2212/6026* (2013.01); *G06F 2212/69* (2013.01)

(58) Field of Classification Search
None
See application file for complete search history.

(56) References Cited

U.S. PATENT DOCUMENTS 5,485,609 A * 1/1996 Vitter ................. G06F 12/0862
6,466,979 B1 * 10/2002 Plouffe, Jr. ......... H04L 12/5695
                                                                370/468

(Continued)

OTHER PUBLICATIONS

"Cache algorithms", Retrieved from en.wikipedia.org/wiki/Cache_algorithms on Sep. 17, 2012, 5 pages.

(Continued)

*Primary Examiner* — Ryan Bertram
*Assistant Examiner* — Tracy Chan
(74) *Attorney, Agent, or Firm* — Perkins Coie LLP

(57) ABSTRACT

Systems and methods for predictive cache replacement policies are provided. In particular, some embodiments dynamically capture and predict access patterns of data to determine which data should be evicted from the cache. A novel tree data structure can be dynamically built that allows for immediate use in the identification of developing patterns and the eviction determination. In some cases, the data can be dynamically organized into histograms, strings, and other representations allowing traditional analysis techniques to be applied. Data organized into histogram-like structures can also be converted into strings allowing for well-known string pattern recognition analysis. The pattern recognition and prediction techniques disclosed also have applications outside of caching.

19 Claims, 10 Drawing Sheets

(56) References Cited

U.S. PATENT DOCUMENTS

| | | | |
|---|---|---|---|
| 6,772,199 B1* | 8/2004 | Keller, Jr. ............. | G06F 12/126 707/E17.12 |
| 7,356,805 B2 | 4/2008 | Ding et al. | |
| 9,323,695 B2 | 4/2016 | Frachtenberg et al. | |
| 2008/0250301 A1* | 10/2008 | Mukhopadhyay .... | H04L 1/0036 714/786 |
| 2010/0064111 A1 | 3/2010 | Kunimatsu et al. | |
| 2012/0016633 A1 | 1/2012 | Wittenstein et al. | |
| 2012/0117509 A1* | 5/2012 | Powell ............. | G06F 17/30528 715/786 |
| 2014/0013052 A1 | 1/2014 | Sawin et al. | |
| 2014/0136792 A1 | 5/2014 | Frachtenberg et al. | |

OTHER PUBLICATIONS

Bansal et al., "CAR: Clock with Adaptive Replacement", FAST '04 Proceedings of the 3rd USENIX Conference on File and Storage Technologies, 2004, pp. 187-200, USENIX Association, Berkeley, CA.

Basu et al., "Scavenger: A New Last Level Cache Architecture with Global Block Priority", Intl. Symp. on Microarchitecture (MICRO), Dec. 2007, Chicago, IL, 12 pages.

Belady, L.A., "A Study of Replacement Algorithms for a Virtual-Storage Computer", IBM Systems Journal, 1966, pp. 78-101, vol. 5, No. 2, 24 pages.

Brown, J., et al., "Music fundamental frequency tracking using a pattern recognition method", Acoustical Society of America, May 1992, pp. 1394-1402.

Byrd, D., "Music Pitches table", 2006 revision, 1 page.

Chaudhuri, Mainak, "Pseudo-LIFO: The Foundation of a New Family of Replacement Policies for Last-level Caches", MICRO'09, Dec. 12-16, 2009, ACM, New York, NY, 12 pages.

Curewitz, K. et al., "Practical Prefetching via Data Compression", 1993, pp. 257-266.

Final Office Action mailed Aug. 31, 2015, for U.S. Appl. No. 13/674,805 by Frachtenberg, E. et al., filed Nov. 12, 2012.

Gill et al., "SARC: Sequential Prefetching in Adaptive Replacement Cache", 2005 USENIX Annual Technical Conference, pp. 293-308, USENIX Association.

Gill et al., "WOW: Wise Ordering for Writes—Combining Spatial and Temporal Locality in Non-Volatile Caches", FAST '05: 4th USENIX Conference on File and Storage Technologies, pp. 129-142, USENIX Association.

Hassidim, Avinatan, "Cache Replacement Policies for Multicore Processors", Sep. 16, 2009, pp. 1-15, Massachusetts Institute of Technology, Cambridge, MA.

Jaleel et al., "High Performance Cache Replacement Using Re-Reference Interval Prediction (RRIP)", ISCA '10, Jun. 19-23, 2010, 978-1-4503-0053-7/10/06, ACM, Saint-Malo, France.

Keramidas et al., "Cache Replacement Based on Reuse-Distance Prediction", Computer Design, 2007, pp. 245-250, 1-4244-1258-7/07, IEEE.

Kroeger et al., "Predicting File System Action from Prior Events", USENIX, 1996, 11 pages.

Lee et al., "LRFU: A Spectrum of Policies that Subsumes the Least Recently Used and Least Frequently Used Policies", IEEE Transactions on Computers, vol. 50, No. 12, Dec. 2001, pp. 1352-1361.

Megiddo et al., "Outperforming LRU with an Adaptive Replacement Cache Algorithm", Computer, Apr. 2004, pp. 4-11, 0018-9162/04, IEEE Computer Society.

Non-Final Office Action mailed Aug. 29, 2014, for U.S. Appl. No. 13/674,805 by Frachtenberg, E. et al., filed Nov. 12, 2012.

Non-Final Office Action mailed Feb. 27, 2015, for U.S. Appl. No. 13/674,805 by Frachtenberg, E. et al., filed Nov. 12, 2012.

Notice of Allowance mailed Dec. 17, 2015, for U.S. Appl. No. 13/674,805 by Frachtenberg, E. et al., filed Nov. 12, 2012.

Palmer et al., "Fido: a Cache that Learns to Fetch", Technical Report No. CS-91-15, Feb. 1991, 13 pages.]

U.S. Appl. No. 13/674,805 by Frachtenberg, E., et al., filed Nov. 12, 2012.

Zhu et al., "Access-Mode Predictions for Low-Power Cache Design", IEEE Micro, Mar.-Apr. 2002, pp. 58-71, 0272-1732/02, IEEE.

\* cited by examiner

PREDICTIVE CACHE REPLACEMENT

CROSS-REFERENCE TO RELATED APPLICATIONS

This application is a continuation of U.S. patent application Ser. No. 13/674,805, entitled "PREDICTIVE CACHE REPLACEMENT," filed on Nov. 12, 2012, issuing on Apr. 26, 2016 as U.S. Pat. No. 9,323,695, which is incorporated herein by reference in its entirety.

TECHNICAL FIELD

Various embodiments of the present invention generally relate to caching policies. More specifically, various embodiments of the present invention relate to systems and methods for predictive cache replacement polices.

BACKGROUND

Caching is a mechanism that accelerates access (i.e., reduces latency) to data on slower storage media by managing a subset of the data in a smaller, faster, and typically more expensive storage medium. As a result, the average latency of the data access will be between the latency of the slower and faster storage. Caches come in many shapes and forms. For example, caches can be embodied in hardware (such as CPU caches) and/or software (such as Memcached). In some cases, caches can also be layered across several storage layers or tiers.

Typically, data access is not uniformly random. Instead, data access often has spatial and/or temporal locality properties. Spatial locality refers to accessing data within a relatively close or similar location to other data that has previously been accessed. Temporal locality refers to the reuse of data that has previously been accessed within a relatively close time period. These locality properties give a measure of predictability to the data that will be accessed, allowing only those data elements predicted to be recalled soon to be stored in the smaller cache.

The ratio of all data accesses that can be served by the cache is called the hit ratio, and is one of the main metrics of success of a cache. Hit ratios can have a significant impact on performance and, as a result, have high economic implications. While there have been many efforts to come up with better ways to determine which items to store in the cache and which to evict to make room for more likely items, the traditional caching policies have been typically based on coarse locality metrics (e.g., oldest items are always evicted). Consequently, data which is more likely to be accessed may be evicted. As such, there are a number of challenges and inefficiencies found in traditional caching policies.

SUMMARY

Systems and methods are described for predictive cache replacement policies. In some embodiments, a method includes counting data access observations that fall into disjoint categories. The disjoint categories may be multi-dimensional in some cases (e.g., time of day and region). A prediction model can be dynamically built to predict future access patterns based on the data access observations. Using this prediction model, a determination can be made as to which data should be evicted from a cache. In some embodiments, building the prediction model includes dynamically building a tree data structure representing the data access observations. The tree data structure can include a plurality of nodes that are added at each time interval and include a cumulative distinct key count. The nodes added at the current time interval can include a current key count. When the current key count is zero, a data access pattern associated with a key associated with the current key count of zero can be recorded.

In some embodiments, the data access observations can be represented with a string pattern by assigning a distinct letter to each data access that corresponds to one of the disjoint categories. Then, the string pattern can be analyzed using a compression algorithm. The string may preserve temporal relations of the data observations.

Some embodiments provide for a computer-implemented method that includes generating a histogram of recorded data access observations that fall into disjoint categories representing time intervals (e.g., uniform or non-uniform intervals) since insertion of data into a cache. A set of access patterns can be generated that can be used to predict a probability of accesses on future data stored in the cache. In some embodiments, the set of access patterns are captured based on the disjoint categories and the histogram of recorded data access observations. By identifying the probability of access on the future data as being lower than any other data based on the set of access patterns, a determination can be made as to which data should be evicted from the cache.

In some embodiments, each element in a data set (e.g., data representing access patterns of data within a cache) can be mapped into one of a plurality of disjoint bins or categories. A string representing the data set can then be dynamically mapped by assigning one or more letters to each of the plurality of disjoint bins or categories. As a result, each element in a data set is represented with the letter assigned to the disjoint bin or category each element was mapped into. A pattern matching analysis can then be performed based on the string. The pattern matching analysis can include a Markov Chain model and/or partial pattern matching by using a pattern's prefix to predict a suffix.

Embodiments of the present invention also include computer-readable storage media containing sets of instructions to cause one or more processors to perform the methods, variations of the methods, and other operations described herein.

Various embodiments of the present invention can include a system having a processor, memory, database, cache, observation engine, prediction module, eviction module, histogram generator, pattern generator, string converter, and/or other modules or components. In some embodiments, the cache can have data stored thereon. The observation engine can be configured to record data access observations regarding how the data is accessed within the cache. The prediction module can dynamically build a statistically aggregated prediction model to predict future access patterns based on the data access observations over time. The eviction module can be configured to evict data from the cache which has the lowest probability of future access as predicted by the statistically aggregated prediction model.

In some embodiments, the histogram generator can be configured to generate a histogram based on the data access observations. The pattern generator can be configured to build a set of access patterns by creating a tree data structure that is updated over time by adding a new set of nodes having a current key count representing a number of data access observations recorded during a current time interval. Each node in the new set of nodes branch (e.g., representing disjoint categories) from previous nodes associated with the previous time interval having a cumulative key count. The string converter can be used to map the data access patterns to a string of characters. In some cases, the string of characters preserves temporal relations of the data access patterns.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
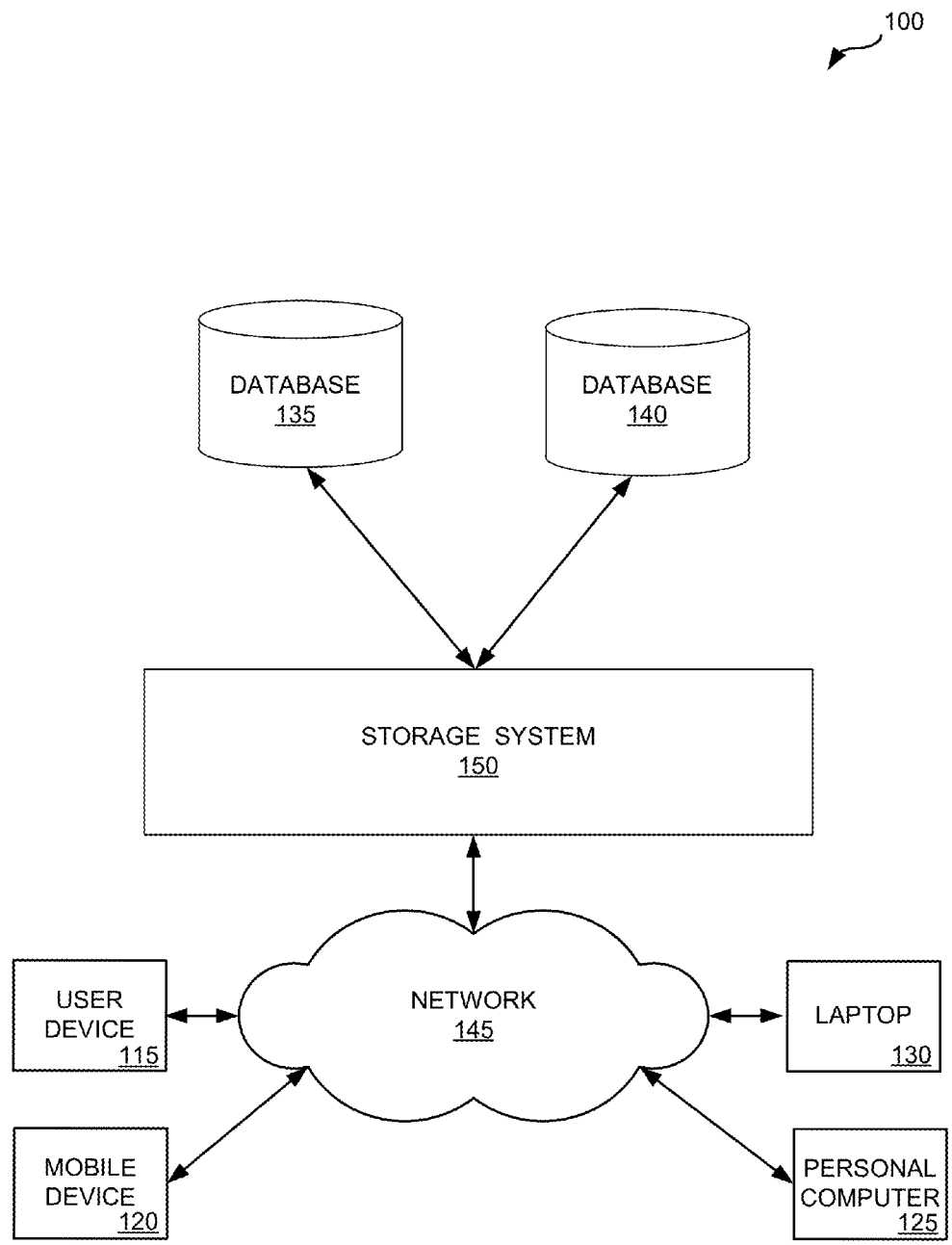
FIG. 1 illustrates an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention relate to cache replacement policies. In particular, some embodiments dynamically capture and predict access patterns of data to determine which data should be evicted from the cache. Cache replacement policies deal with the problem of selecting, at the time of eviction, which item in a cache is least likely to be required in the near future. Traditional cache replacement policies have been typically based on coarse locality metrics (e.g., oldest items or least recently used items are evicted). As a result, these traditional caching policies can result in poor eviction decisions being made.

In contrast, the eviction techniques disclosed herein are not based on coarse locality metrics such as recency of use. Instead, these techniques provide for predictive cache replacement policies based on fine-grained metrics. For example, some embodiments dynamically build a statistically aggregated model of access patterns in time, and at the time of eviction try to predict future accesses based on the pattern each item appears to belong to. As a result, various embodiments of the techniques disclosed can be advantageously applied to all temporal access patterns, whether fast-decaying or slow, as long as data items can be meaningfully grouped by distinguishable temporal patterns. Certain implementations of these techniques can provide one or more of the following advantages: 1) can be faster than queue-based methods; 2) can potentially use less memory; 3) can scale better with the number of threads on multi-core and multi-chip machines; and 4) can increase hit rates for certain workloads.

In some embodiments, a novel tree data structure can be dynamically built that allows for immediate use in the identification of developing patterns and the eviction determination. In some cases, the data can be dynamically organized into histograms, strings, and other representations allowing traditional analysis techniques to be applied. Data organized into histogram-like structures can also be converted into strings allowing for well-known string pattern recognition analysis.

While, for convenience, embodiments of the present invention are described with reference to cache replacement polices, embodiments of the present invention are equally applicable to various other applications where patterns are used for making decisions. For example, embodiments of the pattern recognition and prediction techniques disclosed have applications throughout all levels of caching and outside of caching in such fields as communications and machine learning. Moreover, these techniques are equally applicable in a wide range of systems that exhibit well-defined temporal patterns from end-user devices to large network storage systems (e.g., those used within a social networking system). Other examples include key-value stores (e.g., Memcached), search-engine query caches, webpage caches (both in servers and clients), disk-block cache in operating systems, page cache and translation lookaside buffer (TLB) in computer processors, and countless more cache implementations—virtually anywhere where temporal locality plays a role and enough memory is available to maintain the dynamic histogram data structures described below.

In addition, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

General Description

FIG. 1 illustrates an example of a networked-based environment 100 in which some embodiments of the present invention may be utilized. Companies can store a tremendous amount of data (e.g., photographs, messages, e-mails, electronic documents, or healthcare records). Access to this data can often follow recognizable patterns. For example, when a new photo is added within a social network, the photo may be accessed most frequently within a short period of time and then infrequently accessed. Other types of data may be accessed periodically, almost periodically, or on some other predictable pattern. As a result, various embodiments of the present invention monitor for these predictable access patterns and make more efficient decisions regarding the storage location within a storage system and/or caching.

The data can be submitted through various user devices 115, mobile devices 120, personal computers 125, laptops 130, and/or other devices to allow the data to be stored on one or more databases 135 and 140. As illustrated in FIG. 1, these devices may use network 145 to submit and retrieve information from the databases 135 and 140. Various embodiments of the present use storage system 150 to manage the data storage on databases 135 and 140.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone or similar device.

User device 115 is configured to communicate with storage system 150 via the network 145. In one embodiment, user device 115 executes an application allowing a user of user device 115 to interact with the storage system 150. For example, user device 115 can execute a browser application to enable interaction between the user device 115 and storage system 150 via the network 145. In another embodiment, user device 115 interacts with storage system 150 through an application programming interface (API) that runs on the native operating system of the user device 115, such as IOS® or ANDROID™.

User devices 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Figure 2:
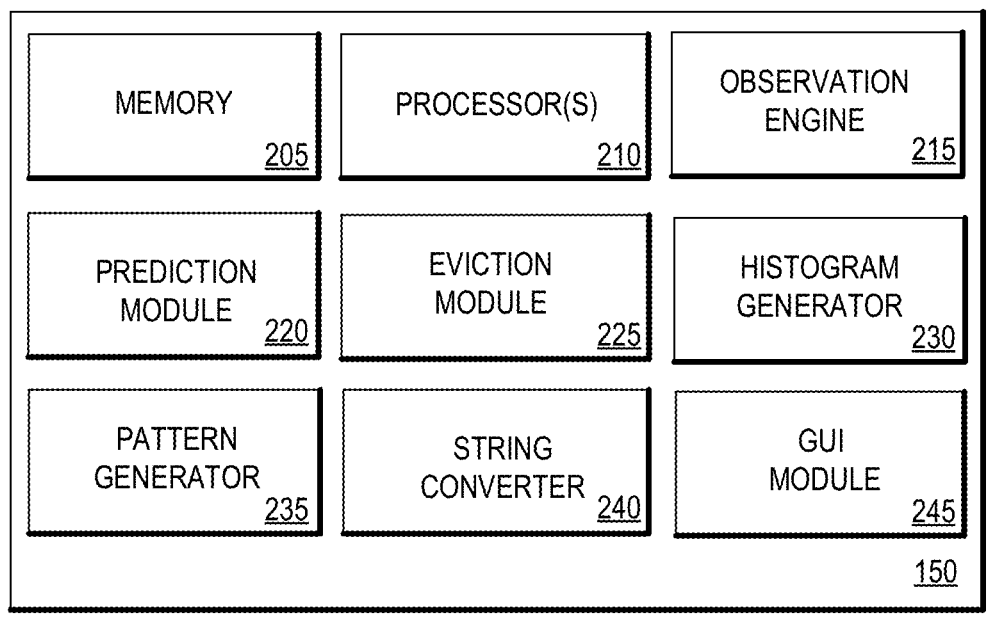
FIG. 2 is a block diagram with a set of components that may be used in a storage system in accordance with various embodiments of the present invention.

FIG. 2 is a block diagram with a set of components that may be used in storage system 150 in accordance with various embodiments of the present invention. According to the embodiments shown in FIG. 2, the system can include memory 205, one or more processors 210, observation engine 215, prediction module 220, eviction module 225, histogram generator 230, pattern generator 235, string converter 240, and graphical user interface (GUI) module 245. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, observation engine 215 and prediction module 220 can be combined into a single module.

Memory 205 can be any device, mechanism, or populated data structure used for storing information. In accordance with some embodiments of the present invention, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMs, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of observation engine 215, prediction module 220, eviction module 225, histogram generator 230, pattern generator 235, string converter 240, and graphical user interface (GUI) module 245.

Observation engine 215 can be configured to record data access observations regarding how the data is accessed within the cache. In some embodiments, observation engine 215 counts data access observations that fall into disjoint categories. The disjoint categories may be multi-dimensional in some cases. For example, the multi-dimensional categories could include time of day and region. Other examples of disjoint categories include but are not limited to, daytime in North America, daytime in Europe, and daytime in Asia. In some embodiments, the categories could be uniformly distributed disjoint time intervals or a set of disjoint non-uniform time intervals. In accordance with various embodiments, observation engine 215 may record data access observations that fall into multiple sets of disjoint categories.

Prediction module 220 can be configured to receive the data access observations from observation engine 215 and build a prediction model. For example, the prediction model may generate a statistical analysis of the data access observations. Using this information, the prediction model can estimate the probability that each data item in the cache will be accessed in the future. In some embodiments, the prediction model can generate a probability for each data item that indicates the likelihood the data item will be accessed within the next time unit, at any time during the future, during a specified time frame, more than a specified number of times in the future, and/or other access predictions. In some embodiments, one or more of these predictions can be weighted (e.g., based on other factors such as importance of the data or the cost to retrieve it again, i.e., miss penalty) and/or combined with other access predictions to generate an overall access score for each data item.

In many cases, the prediction model does not need to be accurate or descriptive at all. For example, for the purpose of determining which items should be evicted from the cache the prediction model only has to effectively compare two or more eviction candidates: which is more likely to be required soon. As a result, the prediction model does not necessarily accurately predict how likely future access will happen. The prediction model can compute a relative value, not an absolute one, in some embodiments. In some cases, a relative value may be computed faster. For example, the model may compute which of the two elements has a longer expected access history in time; a "wider" expected history (more discrete events), or more expected events in the immediate time window to follow. The prediction model can also take into account miss penalty or other weight factors.

Eviction module 225 can receive the access scores from prediction module 215 and determine which data to evict from the cache. For example, in one embodiment, eviction module 225 may evict a data item which has the lowest probability of future access as predicted by the prediction model. Eviction module 225 may also have access to other information (e.g., service level objectives and current system metrics) which can be combined with the access scores and/or access predictions in order to determine which data can be evicted.

Histogram generator 230 can be used to generate a histogram based on the data access observations. In some embodiments, access patterns are dynamically captured by collecting histograms of data accesses. The histograms can have user-defined bins on the x-axis that define units of time and user-defined categories of accesses. The y-axis on the histogram does not have to be continuous or even discrete—it can represent ranges (e.g., from 10 to 20 accesses). As a result, different keys of different but sufficiently similar access patterns can be captured with the same histogram.

The histograms generated by histogram generator 230 can then be used, in various embodiments, by prediction module 215 to predict future data access patterns. For example, suppose a key is currently on its fourth hour since insertion into the cache, and the associated pattern matches the one in the first part of a histogram. Prediction module 230 can then predict the probability (or relativity) of future accesses based on the associated pattern. In some embodiments, eviction module 230 can use this prediction by comparing the results to the prediction associated with a different key, on a different histogram, and/or a different time-location on the same histogram.

Pattern generator 235 can be configured to build a set of access patterns by creating a tree data structure that is updated over time by adding a new set of nodes. The newly added nodes include a current key count for the last time interval and representing a number of data access observations recorded during a current time interval though the branches. The other tree nodes represent a cumulative distinct key count from the past time intervals. In some embodiments, the depth in the tree can represent a time range or interval (possibly logarithmic). The breadth can represent an access count range (possibly logarithmic).

String converter 240 can be used to map the data access patterns to a string of characters. In some embodiments, the data access patterns are mapped to a set of bins or categories that are assigned one or more letters. The letters associated with each bin or category can be concatenated to form the string (e.g., as data access patterns are mapped to the bins or categories). This is illustrated in more detail below in FIG. 8.

In some embodiments, the string of characters preserves temporal and/or categorical relations of the data access patterns. String converter 240 can be used to convert previously recorded patterns and/or patterns that are still developing into strings. A pattern matching analysis or compression analysis can be used to match the strings. For example, the pattern matching analysis can include a partial pattern matching by using a pattern's prefix to predict a suffix.

GUI module 245 can be used to generate one or more graphical user interface screens. These screens can be used to display information (e.g., histograms, data access patterns, and/or strings) to users. In some embodiments, the graphical user interface screens can be used by the users to define or select the disjoint categories used by the other components (e.g., observation engine 215).

Figure 3:
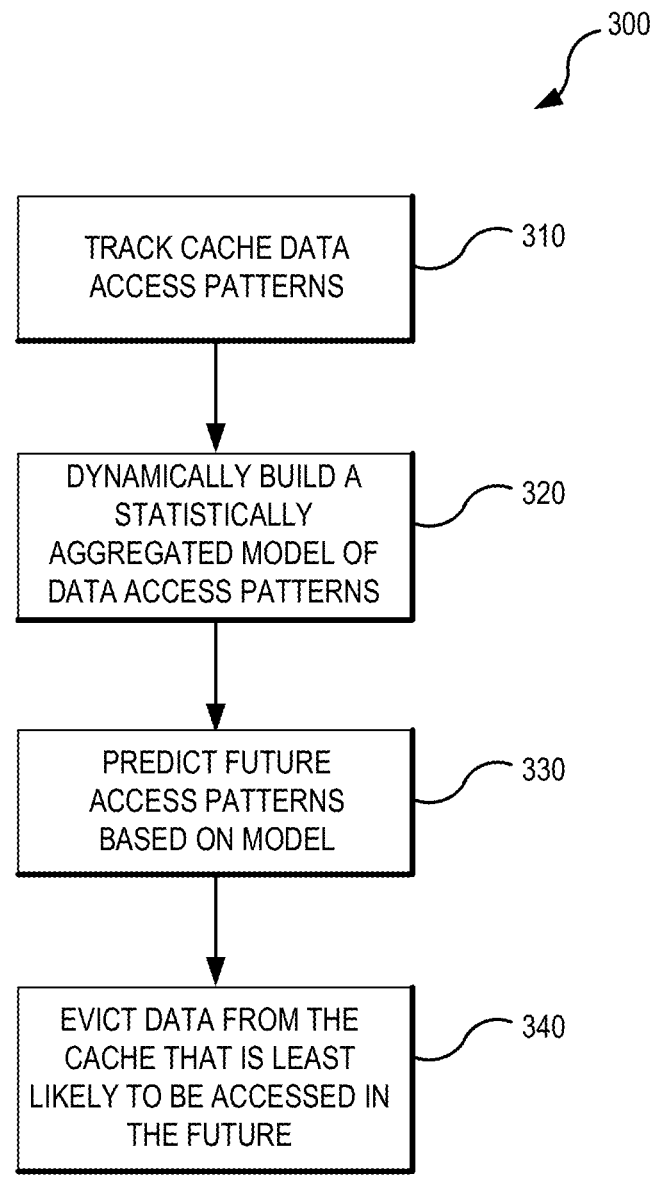
FIG. 3 is a flowchart with a set of operations for evicting data in accordance with one or more embodiments of the present invention.

FIG. 3 is a flowchart with a set of operations 300 for evicting data from a cache in accordance with one or more embodiments of the present invention. The operations illustrated in FIG. 3 may be performed by observation engine 215, prediction module 220, eviction module 225, a processor, and/or other modules, engines, or components. As illustrated in FIG. 3, tracking operation 310 tracks data access patterns within a cache. In some embodiments, tracking operation 310 can include a key counter or other mechanism for tracking access patterns to specific data within the cache.

Using the recorded access patterns, modeling operation 320 can dynamically build a statistically aggregated model of data access patterns. This can include building a histogram in some embodiments. Histograms, however, are just one way to model and predict recurring patterns. Other embodiments of the present invention use techniques from information theory and practical applications such as data compression. For example, modeling operation 320 can use dictionary-based methods (e.g., Lempel-Ziv variants) that build an efficient dictionary of pattern prefixes, which can be represented compactly. Partial Pattern Matching (PPM), which uses a pattern's prefix to guess its suffix, can be used in some embodiments. Still yet, modeling operation can build some models that include Markov Chains.

In accordance with various embodiments, modeling operation 320 can be run off-line on historical data and access patterns. By running modeling operation 320 off-line on historical data and access patterns, a baseline model can be developed. Then, by running modeling operation 320 on a regular schedule, in real-time, or nearly in real-time the statistically aggregated model can be dynamically updated. As a result, the statistically aggregated model generated in modeling operation 320 can evolve over time as the access patterns change.

Prediction operation 330 predicts future access patterns of current data within a cache based on the current version of the model. For example, prediction operation 330 can return a score or probability of future access over one or more time periods (e.g., one hour, two hours, and anytime in the future). Using this information, eviction operation 340 determines which data is least likely to be accessed and should be evicted from the cache.

In some embodiments, some data may be exempted from being evicted from the cache. For example, in at least one embodiment, data that has been inserted into the cache less than a preselected amount of time may be exempt from evictions. Some advantages of this technique include the reduction of processing churn, ensuring each data item gets a fair chance at reuse, and the reduction of memory use. For example, eviction operation may not evict elements in the first hour since their insertion. As a result, the system does not need to store any access pattern for that hour in the histogram, which would likely require more processing and storage than future accesses, in a typical decaying temporal access pattern. Note that the initial time window in which evictions are exempted cannot be overly long as this will not allow enough candidates for eviction.

Figure 4:
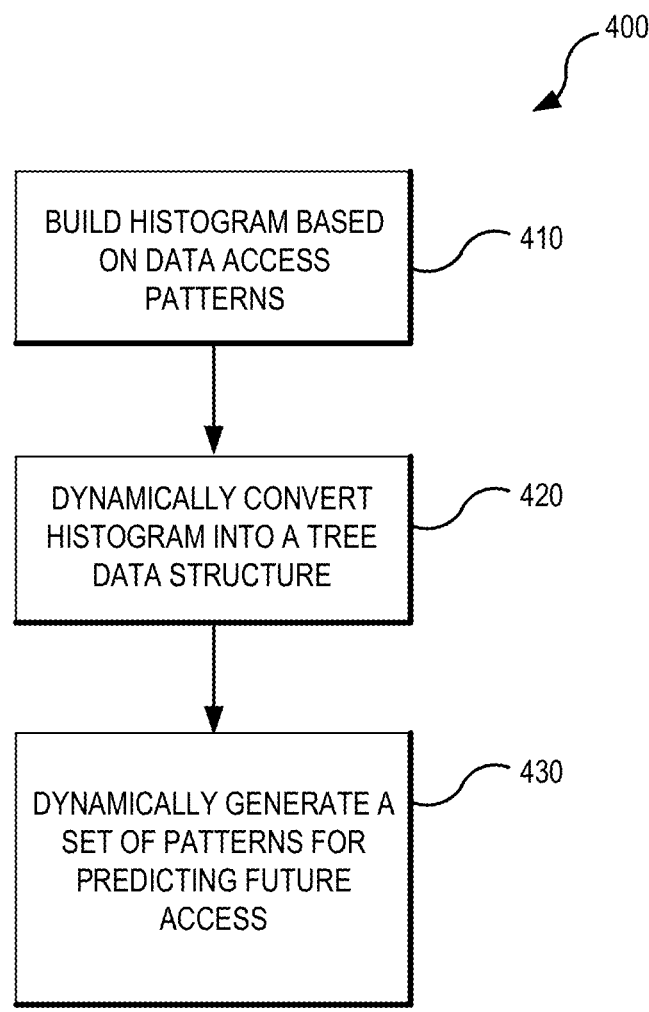
FIG. 4 is a flowchart with a set of operations for generating a histogram-based tree data structure that can be used in accordance with some embodiments of the present invention.

FIG. 4 is a flowchart with a set of operations 410 for generating a histogram-based tree data structure that can be used in accordance with some embodiments of the present invention. The operations illustrated in FIG. 4 may be performed in various embodiments by histogram generator 230 or processor 210. Using a set of data access patterns, building operation 410 builds a histogram. The x-axis can be linear, quadratic, exponential, or any other function that captures typical temporal access patterns for the expected workload. The y-axis can also be linear, quadratic, exponential, or any other function that captures typical grouping of access patterns for the expected workload.

The number of bins (length of x-axis) generated by building operation 410 can be capped. In some embodiments, the last bin may represent accesses from a given point in time to infinity. Bounding the depth of the histogram allows the run time of operations on the histogram to be bounded. The number of possible branches per bin ('width' of each bin) can be capped, to represent that 'X or more' accesses at this time window occurred for some items. Conversion operation 420 can convert the histogram into a tree data structure (e.g., as described below in FIGS. 5-7). Prediction operation 430 can use the tree data structure to collect data patterns and to match collected data patterns to the current access patterns represented by the tree structure.

Figure 5:
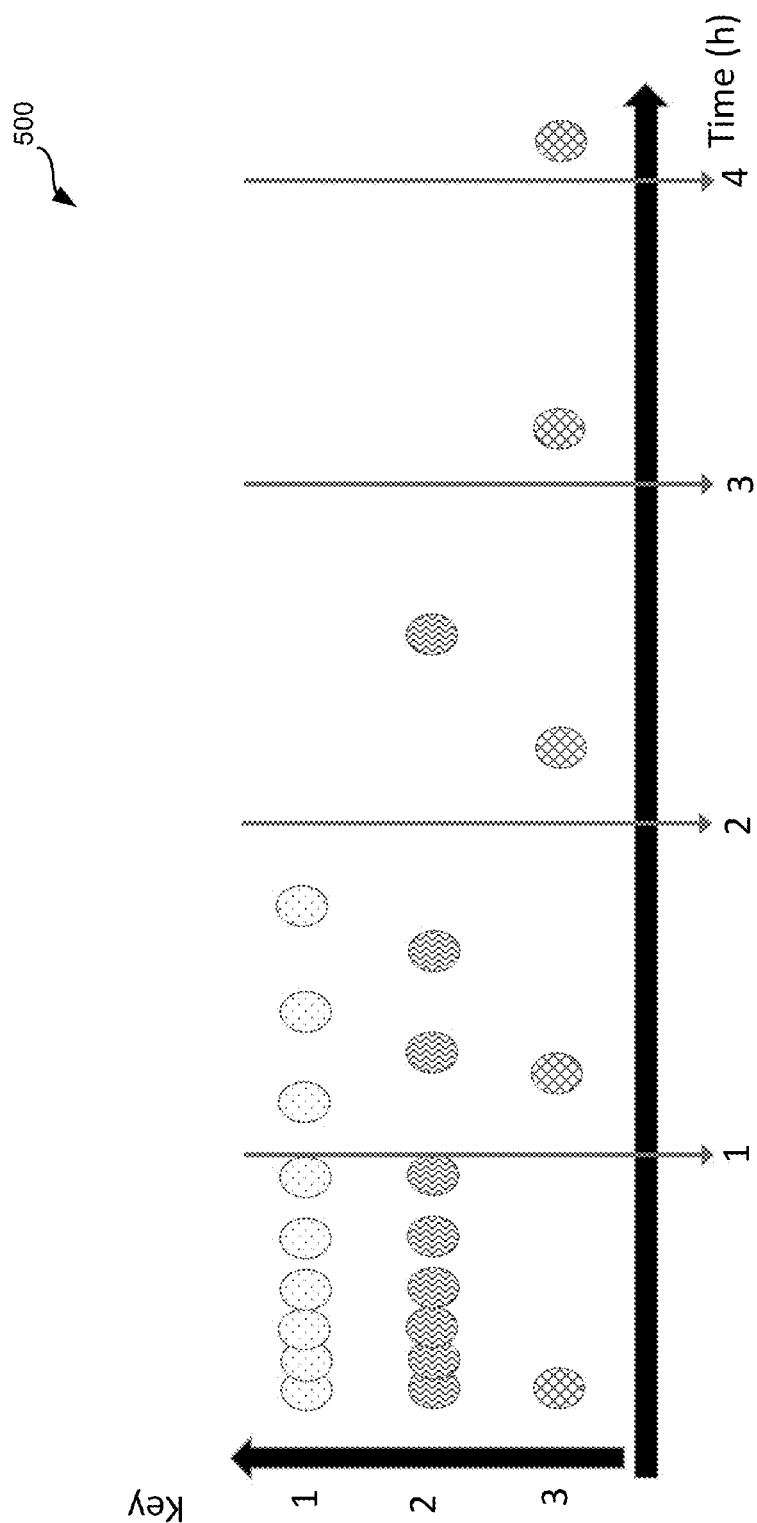
FIG. 5 illustrates examples of data access patterns in accordance with various embodiments of the present invention.

FIG. 5 illustrates examples of data access patterns in accordance with various embodiments of the present invention. As illustrated in FIG. 5, Key 1 has six data accesses within the first hour and three data accesses within the second hour. Key 2 also has six data accesses within the first hour, but only two within the second hour. Finally, Key 3 has one access each hour. Now, suppose at hour two, the cache replacement policy needed to evict some data. An LRU replacement policy would evict Key 3 and then Key 2 as these data items have been accessed the least.

However, suppose that these same data access patterns were previously identified from other data sets. Then, the data access patterns could be used to predict future accesses based on the patterns previously identified. As a result, Key 1 could be evicted at hour two since the data access patterns would indicate that that data would be the least likely to be accessed again in the near future.

Figure 6:
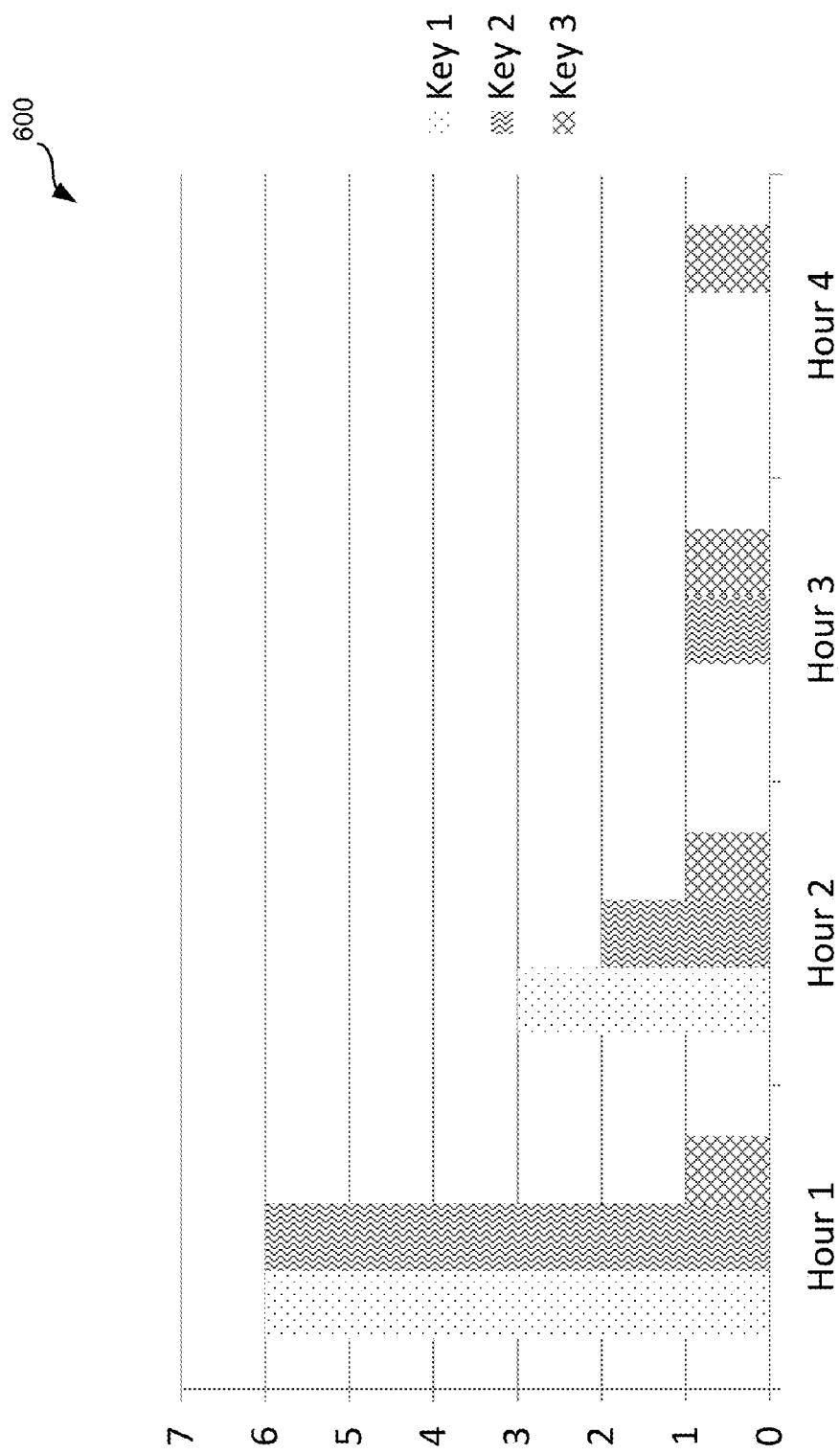
FIG. 6 is a histogram generated based on the data access patterns illustrated in FIG. 5.
Figure 7:
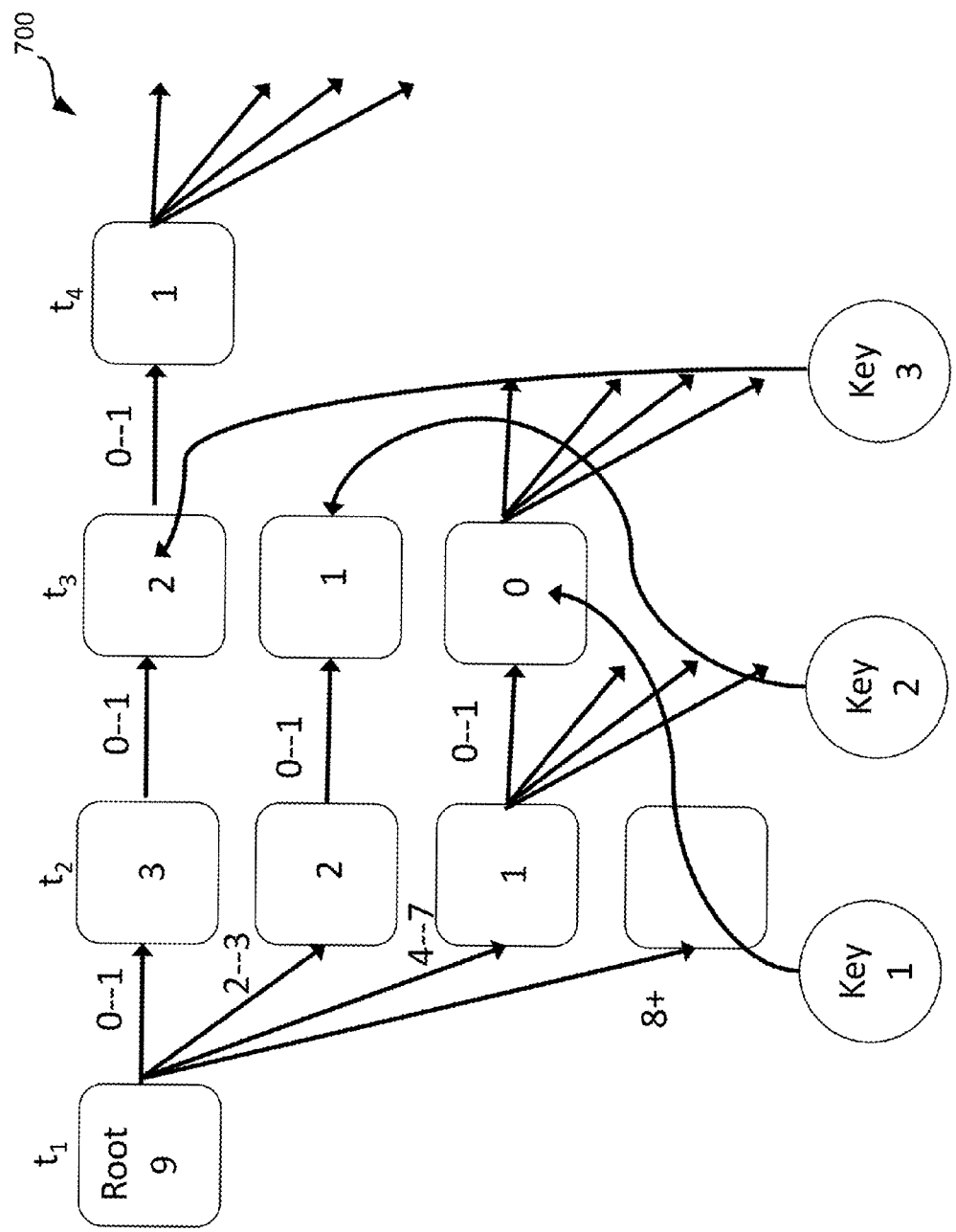
FIG. 7 is an illustration of a dynamically generated histogram-based tree data structure that can be used in some embodiments of the present invention.

FIG. 6 is a histogram 600 generated based on the data access patterns 500 illustrated in FIG. 5. Various embodiments allow for different categorizations of the keys based on cache behaviors or importance criteria. For example, separate sets of histograms may be maintained for Memcached keys that are added at night, because they exhibit different cache characteristics FIG. 7 is an illustration of a dynamically generated histogram-based tree data structure 700 that can be used in some embodiments of the present invention. In particular, the tree data structure illustrated in FIG. 7 corresponds to the data access patterns illustrated in FIG. 5. This data structure allows for the efficient representation of historic histograms and predictions. The data structure easily supports multiple categories, is scalable (lock-free and mostly wait-free), and is CPU cache-friendly.

Each tree node represents a cumulative distinct key count from the past. The breadth in the tree represents a time range and the depth represents an access count range. From the root node, the first set of new nodes were added representing the key counts during the second hour ($t_2$). In particular, there were no keys with eight or more counts, and for key counts zero to one, two to three, and four to seven there was one key count for each key. As such, the first three nodes under $t_2$ initially had a current key count of one.

During the third hour illustrated in FIG. 5, the first and second key had one key count and the third key had zero key counts. As a result, when the nodes were added under $t_3$, the only branches (i.e., ranges of key counts) that had a current key count were zero to one branches for Key 1 and Key 2. There were no current key counts for Key 3. As a result, the first and second nodes under $t_2$ were updated from a one to a two and the third and fourth nodes under $t_2$ were left unchanged. From each of these nodes there was only a key count of one for the first and second key. In some embodiments, the tree can be used to predict future accesses. For example, assume that the data pattern developing is the same pattern as one detected before as determined by monitoring the counters at the end of $t_2$ or $t_3$, clearly preferring Key 1.

During the fourth hour illustrated in FIG. 5, only Key 1 had any counts. In fact, it only had one count. As a result, the cumulative key count of the root node was updated. In addition, the first node under $t_2$ and $t_3$ were updated to three and two, while there were no key count updates to the other nodes. This can continue until a zero is reached in all newly added nodes. Since, this may not happen for a while (if at all) the total amount of memory used by the histogram can be capped to avoid memory overruns. When the available memory is exhausted, the system may stop updating the histogram altogether. The counts can still be updated, but new bins may not be added.

In other embodiments, the current histogram can be discarded before starting the process again with some cost for prediction accuracy for a while. Other embodiments may utilize some "garbage collection" mechanism to free up bins that have low usage count. While some embodiments update the cumulative key count with an increment of one for each count, in some cases, the cumulative key counts can be weighted. For example, in some embodiments, a factor weighted by the breadth (i.e., the number of discrete accesses in the time window) can be included.

In accordance with various embodiments, the usage count is likely to be capped by an implementation-dependent integer representation size (for example, if the count uses a 32-bit integer, it can record no more than $2^{32}$ events without overflowing. The "leftmost" element in the histogram (the "root") is the one likely to reach this cap first. At this point, various embodiments can freeze all further updates to the histogram, start fresh with an empty histogram, and/or employ some mechanism to lower counts in a way that preserves relative count weights among the bins. If the histogram data structure is to be accessed concurrently from many threads, as is common in implementations such as Memcached, accuracy in reads is not critical, and writes can be protected without locks with hardware-supported atomic variables, such as exist on the x86 architecture.

Figure 8:
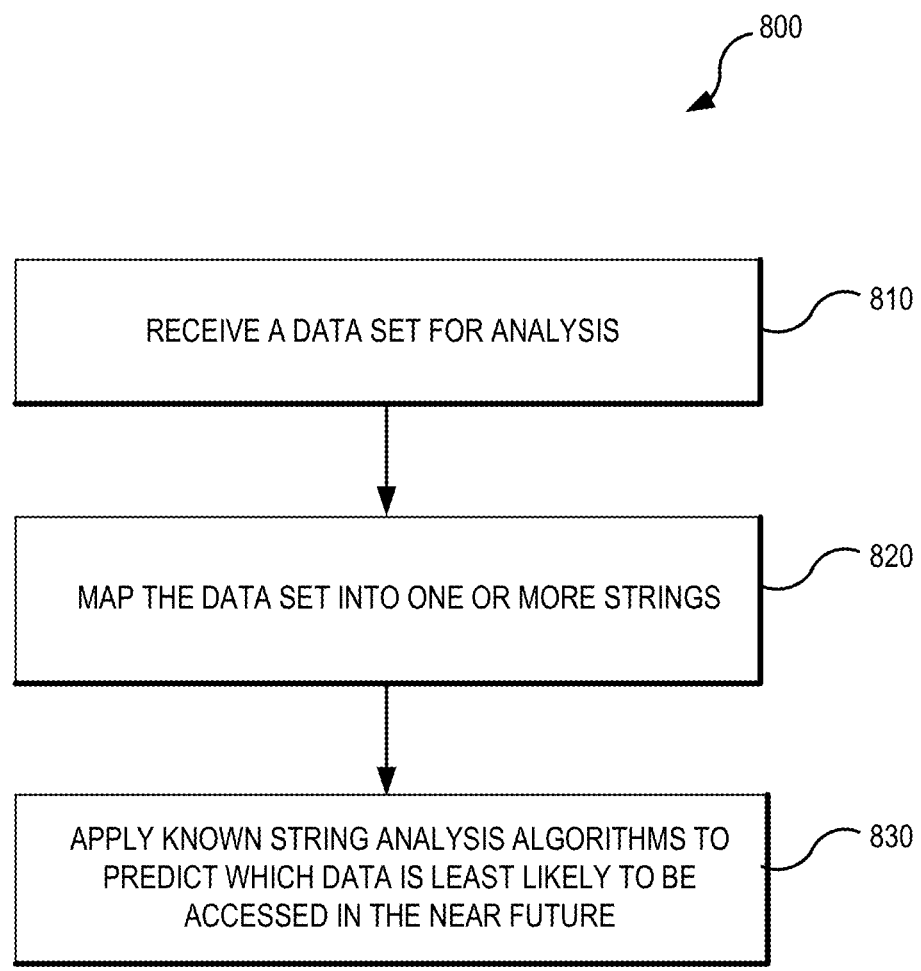
FIG. 8 is a flowchart with a set of operations for performing a compression analysis on a data set in accordance with various embodiments of the present invention.

FIG. 8 is a flowchart with a set of operations 800 for performing a compression analysis on a data set in accordance with various embodiments of the present invention. The operations illustrated in FIG. 8 may be performed in various embodiments by processor 210, string converter 240, and/or other modules, engines, or components of storage system 150. As illustrated in FIG. 8, receiving operation 810 receives a data set for analysis. In some embodiments, the data set may represent data access observations from a cache. Mapping operation 820 maps the data set into one or more strings. Analysis operation 830 can apply one or more string analysis algorithms to predict which data is least likely to be accessed in the near future.

To help illustrate mapping operation 820, suppose that Key 2 from FIG. 5 was received for analysis during receiving operation 810. Now suppose a set of bins were created or assigned such that the first bin represented one key count, the second bin represented two key counts, the third bin represent three key counts, the fourth bin represent four to five key counts, and the fifth bin represented six or more key counts. Now suppose that the letter 'A' was assigned to the first bin, the letter 'B' was assigned to the second bin, the letter 'C' was assigned to the third bin, the letter 'D' was assigned to the fourth bin, and the letter 'E' was assigned to the fifth bin.

Then, at hour 1, mapping operation 820 would map the six key counts recorded in the first hour to the letter 'E'. At hour 2, mapping operation 820 would map the two key counts recorded at the second hour to the letter 13' and append 13' onto the string generated at hour 1 giving the string TB'. At hour three, mapping operation would map the one key count recorded at the third hour to the letter 'A' and append 'A' onto the string generated at hour two giving the string 'EBA.' At hour four, no key counts were recorded during the fourth hour so mapping operation 820 ends.

In a similar fashion, the strings can be generated for the other keys illustrated in FIG. 5. The following table illustrates the string generated at each time interval (i.e., each hour for the case of the keys in FIG. 5) with the bins as described above.

| Time Interval (h) | Key 1 | Key 2 | Key 3 |
|---|---|---|---|
| Interval 1 | E | E | A |
| Interval 2 | EC | EB | AA |
| Interval 3 |  | EBA | AAA |
| Interval 4 |  |  | AAAA |
| Interval 5 |  |  | AAAAA |

Social Networking System Architecture

As mentioned above, embodiments of the present invention can be utilized within a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, or manufacturers. The social networking system allows its users to interact with each other as well as with other objects maintained by the social networking system. In some embodiments, the social networking system allows users to interact with third-party websites and financial account providers.

Based on stored data about users, objects, and connections between users and/or objects, the social networking system can generate and maintain a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system can modify edges connecting the various nodes to reflect the interactions.

Figure 9:
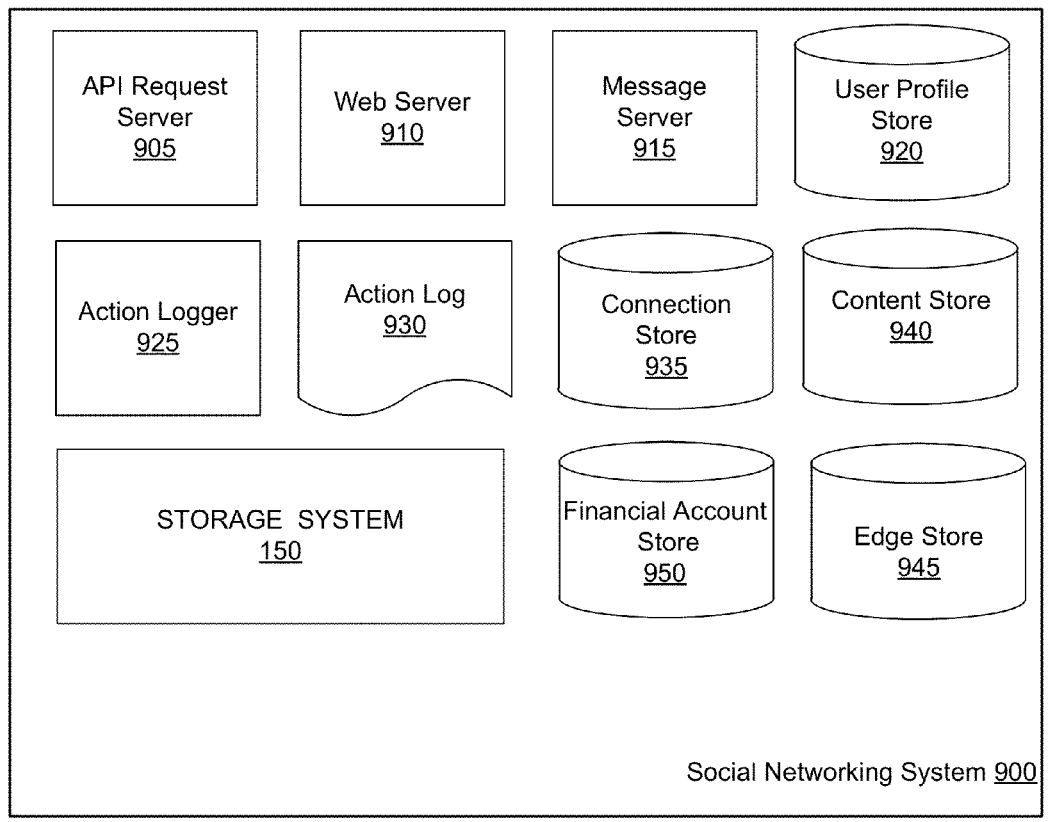
FIG. 9 is a block diagram of a system architecture of a social networking system with which one or more embodiments of the present invention may be utilized.

FIG. 9 is a block diagram of a system architecture of the social networking system 900 with which some embodiments of the present invention may be utilized. Social networking system 900 illustrated by FIG. 9 includes API request server 905, web server 910, message server 915, user profile store 920, action logger 925, action log 930, connection store 935, content store 940, edge store 945, and financial account store 950. In other embodiments, social networking system 900 may include additional, fewer, or different modules for various applications. Conventional components such as network interfaces, security mechanisms, load balancers, failover servers, management and network operations consoles, and the like are not shown so as to not obscure the details of the system architecture.

API request server 905 allows other systems, user devices, or tools to access information from social networking system 900 by calling APIs. The information provided by the social network may include user profile information or the connection information of users as determined by their individual privacy settings. For example, a system, user device, or tools interested in accessing data connections within a social networking system may send an API request to social networking system 900 via a network. The API request is received at social networking system 900 by API request server 905. API request server 905 processes the request by submitting the access request to storage system 150 where access is determined and any data is communicated back to the requesting system, user device, or tools via a network.

Web server 910 links social networking system 900 via a network to one or more client devices; the web server serves web pages, as well as other web-related content, such as Java, Flash, XML, and so forth. The web server 910 may communicate with the message server 915 that provides the functionality of receiving and routing messages between social networking system 900 and client devices. The messages processed by message server 915 can be instant messages, queued messages (e.g., email), text and SMS (short message service) messages, or any other suitable messaging technique. In some embodiments, a message sent by a user to another can be viewed by other users of social networking system 900, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 900 is associated with a user profile, which is stored in user profile store 920. A user profile includes declarative information about the user that was explicitly shared by the user, and may also include profile information inferred by social networking system 900. In one embodiment, a user profile includes multiple data fields, each data field describing one or more attributes of the corresponding user of social networking system 900. The user profile information stored in user profile store 920 describes the users of social networking system 900, including biographic, demographic, and other types of descriptive information, such as work experience, educational history, gender, hobbies or preferences, location, and the like. A user profile may also store other information provided by the user, for example, images or videos. In certain embodiments, images of users may be tagged with identification information of users of social networking system 900 displayed in an image. A user profile in user profile store 920 may also maintain references to actions by the corresponding user performed on content items in content store 940 and stored in the edge store 945.

A user profile may be associated with one or more financial accounts, allowing the user profile to include data retrieved from or derived from a financial account. A user may specify one or more privacy settings, which are stored in the user profile, that limit information from a financial account that social networking system 900 is permitted to access. For example, a privacy setting limits social networking system 900 to accessing the transaction history of the financial account and not the current account balance. As another example, a privacy setting limits social networking system 900 to a subset of the transaction history of the financial account, allowing social networking system 900 to access transactions within a specified time range, transactions involving less than a threshold transaction amount, transactions associated with specified vendor identifiers, transactions associated with vendor identifiers other than specified vendor identifiers or any suitable criteria limiting information from a financial account identified by a user that is accessible by social networking system 900. In one embodiment, information from the financial account is stored in user profile store 920. In other embodiments, it may be stored in financial account store 950.

Action logger 925 receives communications about user actions on and/or off social networking system 900, populating action log 930 with information about user actions. Such actions may include, for example, adding a connection to another user, sending a message to another user, uploading an image, reading a message from another user, viewing content associated with another user, attending an event posted by another user, among others. In some embodiments, action logger 925 receives, subject to one or more privacy settings, transaction information from a financial account associated with a user and identifies user actions from the transaction information. For example, action logger 925 retrieves vendor identifiers from the financial account's transaction history and identifies an object, such as a page, in social networking system 900 associated with the vendor identifier. This allows action logger 925 to identify a user's purchases of products or services that are associated with a page, or another object, in content store 940. In addition, a number of actions described in connection with other objects are directed at particular users, so these actions are associated with those users as well. These actions are stored in action log 930.

Action log 930 may be used by social networking system 900 to track user actions on social networking system 900, as well as external websites that communicate information to social networking system 900. Users may interact with various objects on social networking system 900, including commenting on posts, sharing links, and checking-in to physical locations via a mobile device, accessing content items in a sequence or other interactions. Information describing these actions is stored in action log 930. Additional examples of interactions with objects on social networking system 900 included in action log 930 include commenting on a photo album, communications between users, becoming a fan of a musician, adding an event to a calendar, joining a group, becoming a fan of a brand page, creating an event, authorizing an application, using an application and engaging in a transaction. Additionally, action log 930 records a user's interactions with advertisements on social networking system 900 as well as other applications operating on social networking system 900. In some embodiments, data from action log 930 is used to infer interests or preferences of the user, augmenting the interests included in the user profile and allowing a more complete understanding of user preferences.

Action log 930 may also store user actions taken on external websites and/or determined from a financial account associated with the user. For example, an e-commerce website that primarily sells sporting equipment at bargain prices may recognize a user of social networking system 900 through social plug-ins that enable the e-commerce website to identify the user of social networking system 900. Because users of social networking system 900 are uniquely identifiable, e-commerce websites, such as this sporting equipment retailer, may use the information about these users as they visit their websites. Action log 930 records data about these users, including webpage viewing histories, advertisements that were engaged, purchases made, and other patterns from shopping and buying. Actions identified by action logger 925 from the transaction history of a financial account associated with the user allow action log 930 to record further information about additional types of user actions.

In some embodiments, social networking system 900 further stores data describing one or more connections between different users in the connection store 935. The data describing one or more connections can include a list of connections, a date each connection (i.e., friendship) was made, etc. The connections may be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users may select from predefined types of connections, or define their own connection types as needed. Some or all of this information may also be stored as edge objects in edge store 945.

Content store 940 stores content items associated with a user profile, such as images, videos or audio files. Content items from content store 940 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 900. Examples of social networking content items include suggested connections or suggestions to perform other actions, media provided to, or maintained by, social networking system 900 (e.g., pictures or videos), status messages or links posted by users to the social networking system, events, groups, pages (e.g., representing an organization or commercial entity), and any other content provided by, or accessible via, the social networking system.

Content store 940 also includes one or more pages associated with entities having user profiles in user profile store 920. An entity is a non-individual user of social networking system 900, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 940, allowing social networking system users to more easily interact with the vendor via social networking system 900. A vendor identifier is associated with a vendor's page, allowing social networking system 900 to identify the vendor and/or to retrieve additional information about the vendor from user profile store 920, action log 930 or from any other suitable source using the vendor identifier. In some embodiments, the content store 940 may also store one or more targeting criteria associated with stored objects and identifying one or more characteristics of a user to which the object is eligible to be presented.

In one embodiment, edge store 945 stores the information describing connections between users and other objects on social networking system 900 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 900, such as expressing interest in a page on the social networking system, sharing a link with other users of the social networking system, and commenting on posts made by other users of the social networking system. Edge store 945 stores edge objects that include information about the edge, such as affinity scores for objects, interests, and other users. Affinity scores may be computed by social networking system 900 over time to approximate a user's affinity for an object, interest, and other users in social networking system 900 based on the actions performed by the user. Multiple interactions between a user and a specific object may be stored in one edge object in edge store 945, in one embodiment. In some embodiments, connections between users may be stored in user profile store 920, or user profile store 920 may access edge store 945 to determine connections between users.

Exemplary Computer System Overview

Figure 10:
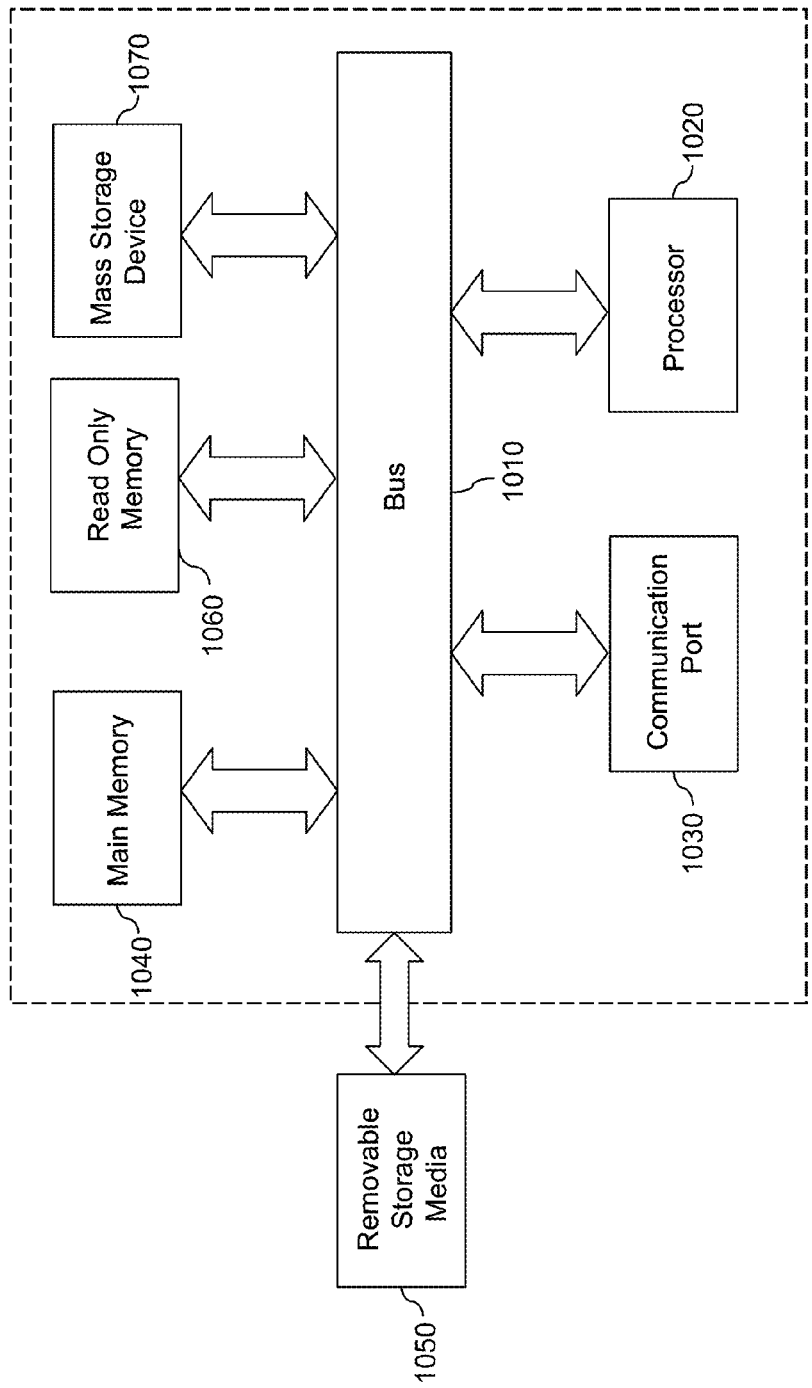
FIG. 10 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 10 is an example of a computer system 1000 with which embodiments of the present invention may be utilized. According to the present example, the computer system includes a bus 1010, at least one processor 1020, at least one communication port 1030, a main memory 1040, a removable storage media 1050, a read only memory 1060, and a mass storage 1070.

Processor(s) 1020 can be any known processor, such as, but not limited to, an Intel® Itanium® or Itanium 2® processor(s); AMD® Opteron® or Athlon MP® processor(s); or Motorola® lines of processors. Communication port(s) 1030 can be any of an RS-232 port for use with a modem-based dialup connection, a 10/100 Ethernet port, or a Gigabit port using copper or fiber. Communication port(s) 1030 may be chosen depending on a network such as a Local Area Network (LAN), Wide Area Network (WAN), or any network to which the computer system 1000 connects.

Main memory 1040 can be Random Access Memory (RAM) or any other dynamic storage device(s) commonly known in the art. Read only memory 1060 can be any static storage device(s) such as Programmable Read Only Memory (PROM) chips for storing static information such as instructions for processor 1020.

Mass storage 1070 can be used to store information and instructions. For example, hard disks such as the Adaptec® family of SCSI drives, an optical disc, an array of disks such as RAID, such as the Adaptec® family of RAID drives, or any other mass storage devices may be used.

Bus 1010 communicatively couples processor(s) 1020 with the other memory, storage and communication blocks. Bus 1010 can be a PCI/PCI-X or SCSI based system bus depending on the storage devices used.

Removable storage media 1050 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

In conclusion, the present invention provides novel systems, methods and arrangements for predictive cache replacement policies. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method, comprising:
   recording observations of data accesses from a cache;
   dynamically building a prediction model to predict future access patterns based on the recorded observations of data accesses,
   wherein the prediction model dynamically builds a dictionary of pattern prefixes based on the recorded observations of data accesses;
   analyzing observations of current data accesses from the cache to predict future access patterns by performing a partial pattern match using the dictionary of pattern prefixes,
   wherein the observations of data accesses are represented as a tree data structure that includes a plurality of nodes with each node representing a cumulative distinct key count,
   wherein the partial pattern match predicts one or more suffixes representing the predicted future access patterns;
   monitoring the plurality of nodes for a current key count of zero, wherein recording the observations of data accesses includes identifying a data access pattern associated with a key associated with the current key count of zero;
   upon determining that the data accesses are associated with insertion of data into the cache within a time interval of recording the observations of the data accesses, exempting eviction of the inserted data; and
   evicting data from the cache based on the predicted future access patterns.

2. The method of claim 1, wherein dynamically building the prediction model to predict future access patterns based on the recorded observations of data accesses is performed off-line using historical observations of the data accesses.

3. The method of claim 2, wherein the prediction model built off-line is a baseline prediction model and dynamically building the prediction model further comprises dynamically updating the baseline prediction model based on additional data accesses.

4. The method of claim 1, wherein analyzing observations of current data accesses from the cache to predict future access patterns includes
   creating a string based on the recorded observations;
   matching a portion of the string to one or more entries in the dictionary of pattern prefixes; and
   identifying the suffix in each of the one or more entries to generate the predicted future access patterns.

5. The method of claim 1, wherein evicting the data from the cache is also based on a cost to retrieve the data when the data is evicted from the cache.

6. The method of claim 1, wherein the observations of data accesses are classified into one or more sets of mutually disjoint categories.

7. A system, comprising:
   a processor; and
   a cache having data stored thereon, wherein the processor has instructions stored thereon configured to:
   record data access observations regarding how the data is accessed within the cache,
   wherein the observations of data accesses are represented as a tree data structure that includes a plurality of nodes with each node representing a cumulative distinct key count;
   dynamically build a prediction model to predict future access patterns based on the recorded data access observations,
   wherein the prediction module builds the prediction model with a dictionary of pattern prefixes based on the recorded data access observations;
   monitor the plurality of nodes for a current key count of zero, wherein recording the observations of data accesses includes identifying a data access pattern associated with a key associated with the current key count of zero;
   upon determining that the data accesses are associated with insertion of data into the cache within a time interval of recording the observations of the data accesses, exempt eviction of the inserted data; and
   evict data from the cache which has the lowest value as scored by the prediction model.

8. The system of claim 7, wherein the prediction module uses Lempel-Ziv techniques to build the dictionary of pattern prefixes.

9. The system of claim 7, wherein the instructions are further configured to:
   map the recorded data access observations to a string of characters.

10. The system of claim 9, wherein the string of characters preserves temporal relations.

11. The system of claim 7, wherein the instructions are further configured to:
    generate a histogram based on the recorded data access observations.

12. The system of claim 7, wherein the instructions are further configured to:
    build a set of access patterns by creating a tree data structure that is updated over time by adding a new set of nodes having a current key count representing a number of data access observations recorded during a current time interval.

13. The system of claim 7, wherein dynamically building the prediction model to predict future access patterns based on the recorded data access observations includes building a baseline prediction model using off-line historical data access observations.

14. The system of claim 13, wherein dynamically building the prediction model further comprises dynamically updating the baseline prediction model as additional data access observations are recorded by the observation engine.

15. A non-transitory computer-readable medium having instructions stored thereon that, when executed by one or more processors, cause a computing device to:
build a prediction model, using observations of data accesses from a cache, to predict future access patterns, wherein the prediction model includes a dictionary of pattern prefixes built from the observations of data accesses;
analyze the observations of data accesses from the cache to predict future access patterns by performing a partial pattern match using the dictionary of pattern prefixes, wherein the observations of data accesses are represented as a tree data structure that includes a plurality of nodes with each node representing a cumulative distinct key count,
wherein the partial pattern match predicts a suffix to the prefix using the dictionary of pattern prefixes,
wherein the suffix represents the predicted future access patterns;
monitor the plurality of nodes for a current key count of zero, wherein recording the observations of data accesses includes identifying a data access pattern associated with a key associated with the current key count of zero; and
upon determining that the data accesses are associated with insertion of data into the cache within a time interval of recording the observations of the data accesses, exempting eviction of the inserted data; and
evict data from the cache based on the predicted future access patterns identified by the suffix.

16. The non-transitory computer readable medium of claim 15, wherein the prediction model is initially built off-line using historical observations of the data accesses.

17. The non-transitory computer readable medium of claim 16, wherein the prediction model initially built using off-line historical observations is dynamically updated in real-time or near real-time as additional data accesses are observed.

18. The non-transitory computer readable medium of claim 15, wherein the prediction model uses Lempel-Ziv techniques to build the dictionary of pattern prefixes.

19. The non-transitory computer readable medium of claim 15, wherein the instructions when executed by the one or more processors evict the data from the cache also based on a cost to retrieve the data when the data is evicted from the cache.

* * * * *